United States Patent
Seok

(10) Patent No.: US 9,596,645 B2
(45) Date of Patent: Mar. 14, 2017

(54) METHOD AND APPARATUS FOR MAINTAINING ASSOCIATION IN WIRELESS LAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/266,703

(22) Filed: Sep. 15, 2016

(65) Prior Publication Data

US 2017/0006526 A1    Jan. 5, 2017

Related U.S. Application Data

(63) Continuation of application No. 14/054,431, filed on Oct. 15, 2013, now Pat. No. 9,491,730.

(60) Provisional application No. 61/713,633, filed on Oct. 15, 2012, provisional application No. 61/721,028, filed on Nov. 1, 2012, provisional application No. 61/730,472, filed on Nov. 27, 2012.

(51) Int. Cl.
| | |
|---|---|
| *H04W 48/14* | (2009.01) |
| *H04W 4/00* | (2009.01) |
| *H04W 60/04* | (2009.01) |
| *H04W 84/12* | (2009.01) |
| *H04B 7/04* | (2006.01) |

(52) U.S. Cl.
CPC ........... *H04W 48/14* (2013.01); *H04W 4/005* (2013.01); *H04W 60/04* (2013.01); *H04B 7/0413* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2007/0243888 A1 | 10/2007 | Faccin | 455/461 |
| 2009/0323608 A1 | 12/2009 | Adachi et al. | 370/329 |
| 2012/0231828 A1 | 9/2012 | Wang et al. | |
| 2013/0176897 A1 | 7/2013 | Wang et al. | 370/254 |
| 2014/0064245 A1 | 3/2014 | Abraham et al. | 370/331 |

FOREIGN PATENT DOCUMENTS

| | | |
|---|---|---|
| JP | 2009-520433 A | 5/2009 |
| KR | 10-2005-0078096 A | 8/2005 |
| KR | 10-2008-0106961 A | 12/2008 |
| RU | 2352074 C2 | 4/2009 |

(Continued)

OTHER PUBLICATIONS

Song: "FILS Association", XP 068037243, IEEE 802.11-11/1169r1, Jan. 17, 2012, pp. 4-6, 8.

(Continued)

*Primary Examiner* — Diane Lo
(74) *Attorney, Agent, or Firm* — Dentons US LLP

(57) ABSTRACT

A method and apparatus for maintaining association in a WLAN system are disclosed. The method for performing association by a station (STA) in a wireless LAN (WLAN) system includes: transmitting an association request frame from the station (STA) to an access point (AP); and receiving an association response frame from the access point (AP) in response to the association request frame. If the association request is accepted by the access point (AP), the association response frame includes information regarding an association comeback time.

16 Claims, 10 Drawing Sheets

(56) References Cited

FOREIGN PATENT DOCUMENTS

WO      2011/066409 A1     6/2011

OTHER PUBLICATIONS

Hamilton: "802.11 TGmb LB163 Proposed Resolution of Clause 11.3 (Non-Architecture) comments", XP017676570, IEEE 802.11-10/0728r55, Nov. 4, 2010, p. 9.
"IEEE Standard for Information Technology—Telecommunications and information exchange between systems—Local and metropolitan area networks—Specific requirements. Part 11: Wireless LAN Medium Access Control (MAC) and Physical Layer (PHY) Specifications. Amendment 4: Protected Management Frames", XP017694834, IEEE Standard, Sep. 30, 2009, pp. 9-10, 19, 21-22, 73-74.
Seok: "Security Procedure for Long Sleeper", XP068040400, IEEE 802.11-13/0026r0, Jan. 13, 2013, pp. 1-12.
Panasonic, "Extended sleep mode for battery powered STAs", IEEE 802.11-12/0656r0, May 15, 2012.
Martin Eian et al., "A Formal Analysis of IEEE 802.11w Deadlock Vulnerabilities", IEEE, Mar. 25, 2012.
IEEE Computer Society IEEE 802.11w-2009, Part 11 Amendment 4, Sep. 30, 2009 pp. 2-91.

FIG. 11
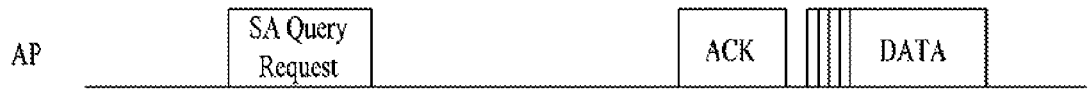
(a) Immediate Secure PS-Poll
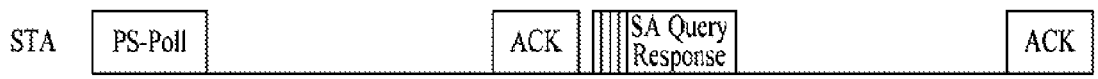
(b) Deferred Secure PS-Poll
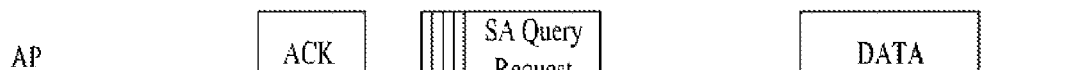
(c) Deferred Secure PS-Poll with No ACK Policy
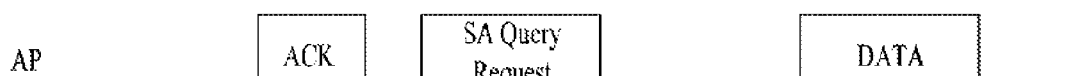
(d) Deferred Secure PS-Poll with No ACK Policy

METHOD AND APPARATUS FOR MAINTAINING ASSOCIATION IN WIRELESS LAN SYSTEM

This application is a Continuation of U.S. patent application Ser. No. 14/054,431, filed on Oct. 15, 2013, which claims the benefit of U.S. Provisional Application No. 61/713,633, filed on Oct. 15, 2012, U.S. Provisional Application No. 61/721,028, filed on Nov. 1, 2012, and U.S. Provisional Application No. 61/730,472, filed on Nov. 27, 2012, which are hereby incorporated by reference as if fully set forth herein.

BACKGROUND OF THE INVENTION

Field of the Invention

The present invention relates to a wireless communication system, and more particularly to a method and apparatus for maintaining association in a wireless LAN (WLAN) system.

Discussion of the Related Art

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

SUMMARY OF THE INVENTION

Accordingly, the present invention is directed to a method and apparatus for maintaining association in a WLAN system that substantially obviate one or more problems due to limitations and disadvantages of the related art. Machine to Machine (M2M) communication technology has been discussed as next generation communication technology. A technical standard for supporting M2M communication in IEEE 802.11 WLAN has been developed as IEEE 802.11ah. M2M communication may consider a scenario capable of communicating a small amount of data infrequently at low speed in an environment including a large number of devices.

An object of the present invention is to provide a method for enabling a station (STA) to maintain correct association with an access point (AP).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing association by a station (STA) in a wireless LAN (WLAN) system includes: transmitting an association request frame from the station (STA) to an access point (AP); and receiving an association response frame from the access point (AP) in response to the association request frame, wherein, if the association request is accepted by the access point (AP), the association response frame includes information regarding an association comeback time.

In accordance with another aspect of the present invention, a method for supporting association of a station (STA) by an access point (AP) in a wireless LAN (WLAN) system includes: receiving an association request frame from the station (STA); and transmitting an association response frame to the station (STA) in response to the association request frame, wherein, if the association request is accepted by the access point (AP), the association response frame includes information regarding an association comeback time.

In accordance with another aspect of the present invention, a station (STA) device for performing association in a wireless LAN (WLAN) system includes: a transceiver; and a processor, wherein the processor transmits an association request frame to an access point (AP) using the transceiver, and receives an association response frame from the access point (AP) in response to the association request frame, wherein, if the association request is accepted by the access point (AP), the association response frame includes information regarding an association comeback time.

In accordance with another aspect of the present invention, an access point (AP) device for supporting association of a station (STA) in a wireless LAN (WLAN) system includes: a transceiver; and a processor, wherein the processor receives an association request frame from the station (STA) using the transceiver, and transmits an association response frame to the station (STA) in response to the association request frame using the transceiver, wherein, if the association request is accepted by the access point (AP), the association response frame includes information regarding an association comeback time.

The following description may be commonly applied to the embodiments of the present invention.

The STA may awake on the basis of the association comeback time, and attempts to receive a Security Association (SA) query request frame from the AP.

The STA may awake at intervals of the same or shorter time than a predetermined time indicated by the association comeback time, and attempts to receive the SA query request frame.

Upon receiving the SA query request frame from the AP, the STA may transmit the SA query response frame to the AP.

Through reception of the SA query request frame or transmission of the SA query response frame, a valid SA status of the STA may be maintained.

A timeout value of an SA query process may be established on the basis of the association comeback time.

The timeout value of the SA query process may be set to a value of a dot11AssociationSAQueryMaximumTimeout parameter.

If the association request is accepted by the AP, a status code of the association response frame may be set to zero (0), wherein the status code '0' indicates "SUCCESS".

If the association request is rejected by the AP, the association response frame may include information regarding the association comeback time.

If the association request is rejected by the AP, a status code of the association response frame may be set to 30, wherein the status code '30' indicates "Association request rejected temporarily; try again later".

The STA may operate in a power save (PS) mode.

The station (STA) may have a Security Association (SA) status with the access point (AP) before transmitting the association request frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

FIG. 11 is conceptual diagrams illustrating various embodiments of the secure PS-Poll process.

DESCRIPTION OF SPECIFIC EMBODIMENTS

Figure 1:
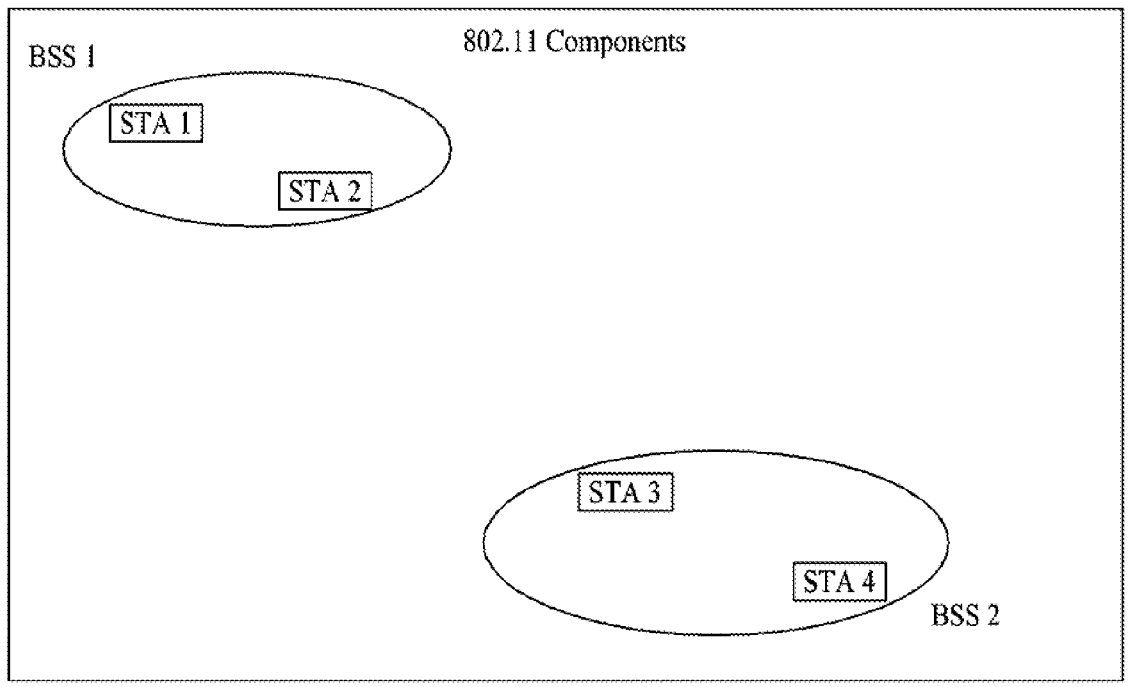
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
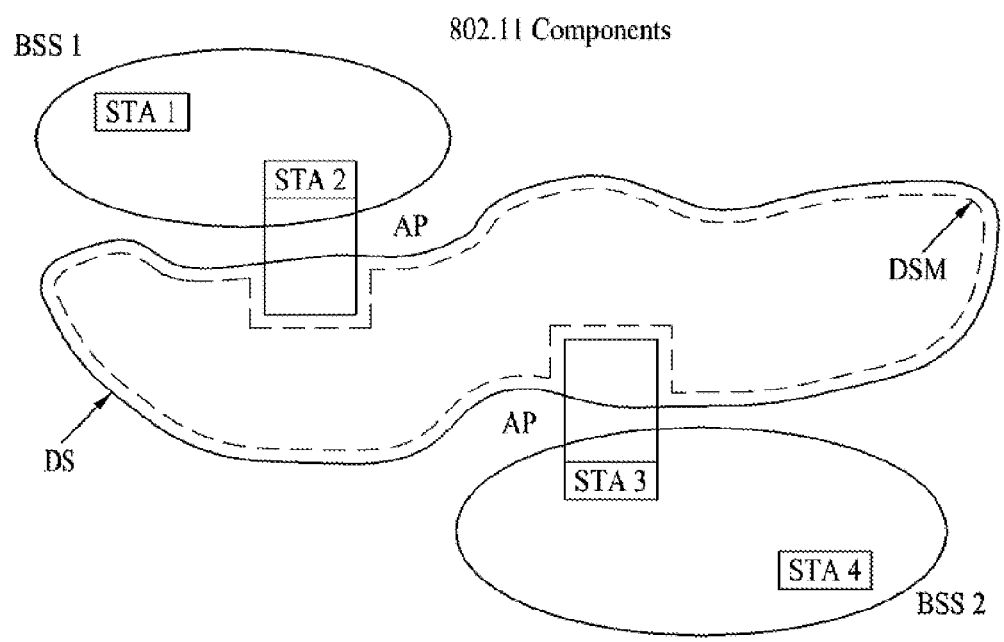
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
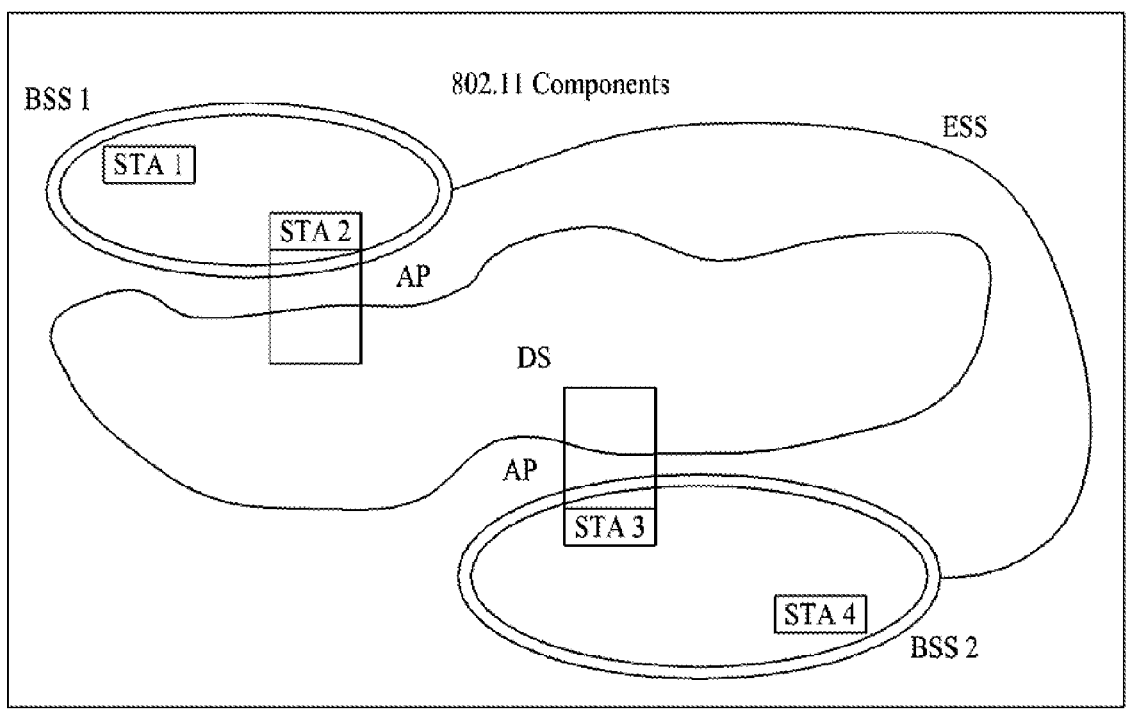
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
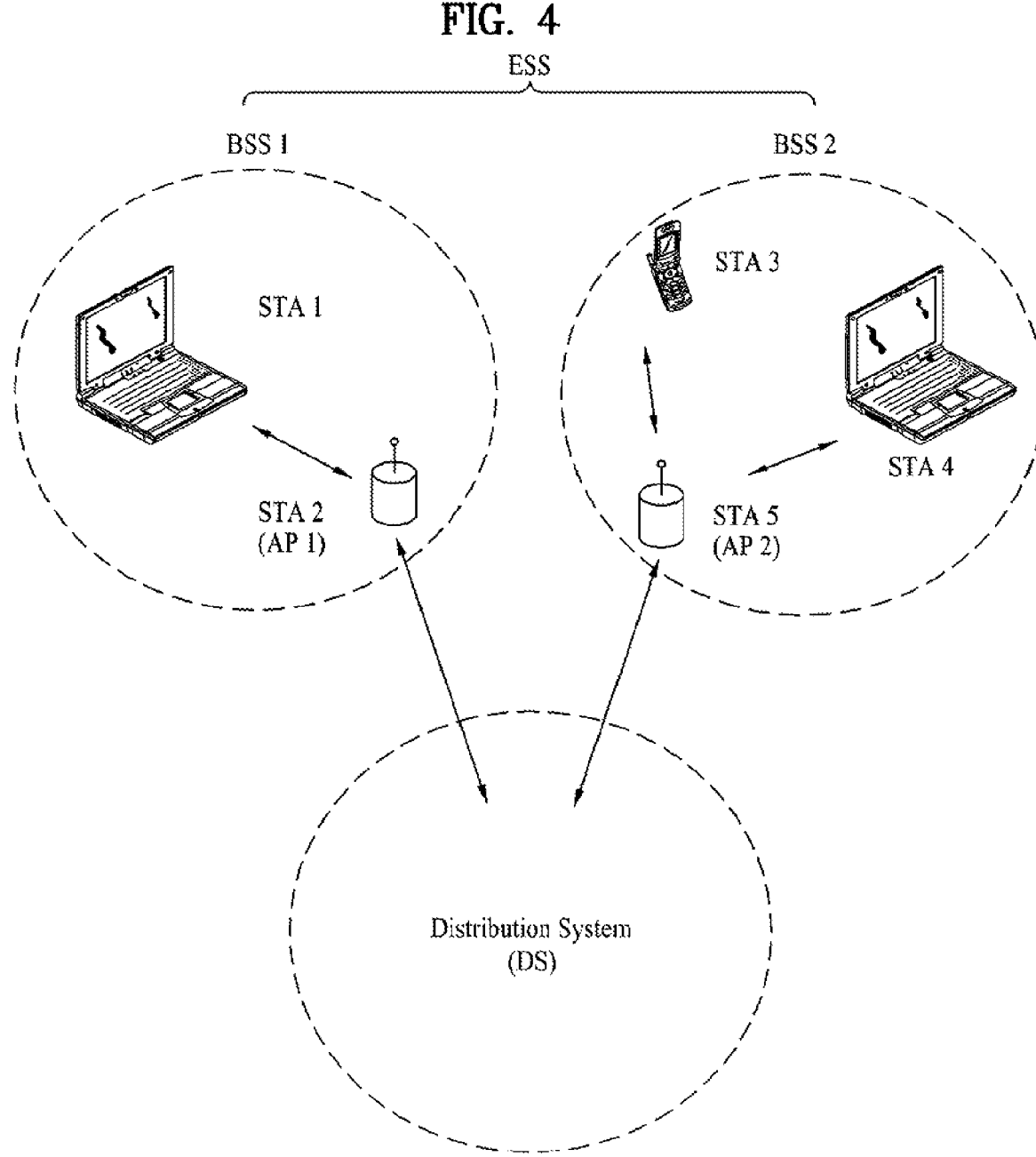
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Structure

The operations of AP and/or STA for use in the WLAN system will hereinafter be described in terms of a layer structure. The layer structure may be implemented by a processor in terms of a device construction. AP or STA may include a plurality of layer structures. For example, the layer structure described in 802.11 documents is mainly composed of a MAC sublayer and a PHY layer on a Data Link Layer (DLL). The PHY layer may include a Physical Layer Convergence Procedure (PLDP) entity, a Physical Medium Dependent (PMD) entity, etc. The MAC sublayer and the PHY layer may conceptually include one management entity referred to as a MAC sublayer management entity (MLME) and another management entity referred to as a Physical Layer management entity (PLME). The above entities may provide a layer management service interface for operating a layer management function.

In order to provide correct MAC operation, a Station Management Entity (SME) is present within each AP or each STA. The SME may be a layer independent entity that can be viewed as residing in a separate management plane or as residing "off to the side". In order to provide correct MAC operation, an SME (Station Management Entity; 1430) is present within each STA. The SME (1430) is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs), and similarly setting the value of layer-specific parameters. SME would typically perform such functions on behalf of general system management entities and would implement standard management protocols.

The above-mentioned entities interact in various ways. For example, GET/SET primitives are exchanged between the entities, such that the above entities interact with each other. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

Also, various MLME_GET/SET primitives may be exchanged between MLME and SME via MLME_SAP (Service Access Point). Various PLME_GET/SET primitives may be exchanged between PLME and SME via PLME_SAP, and may be exchanged between MLME and PLME via MLME-PLME_SAP.

Link Setup Process

Figure 5:
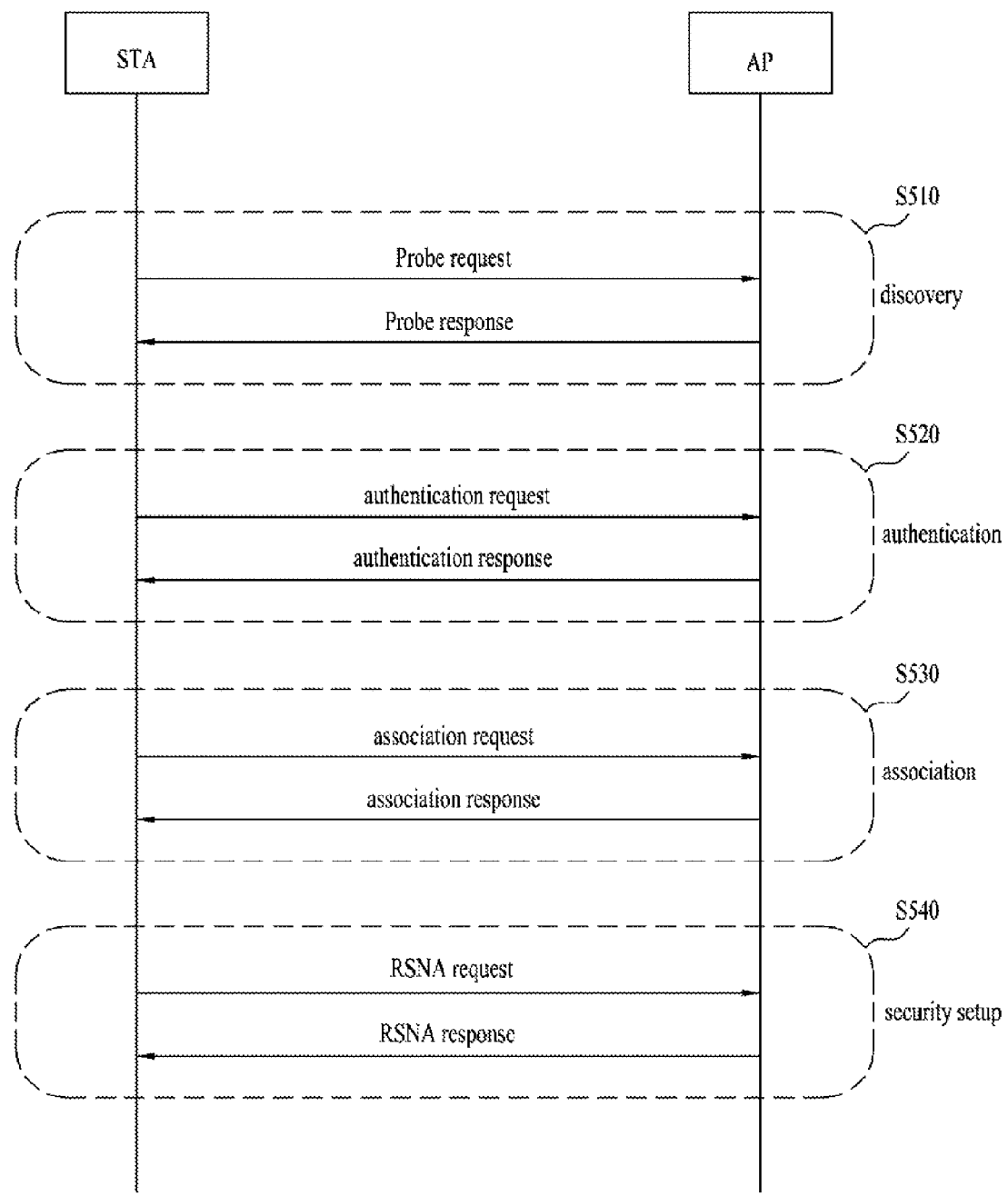
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a status code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54-698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc.

As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 6:
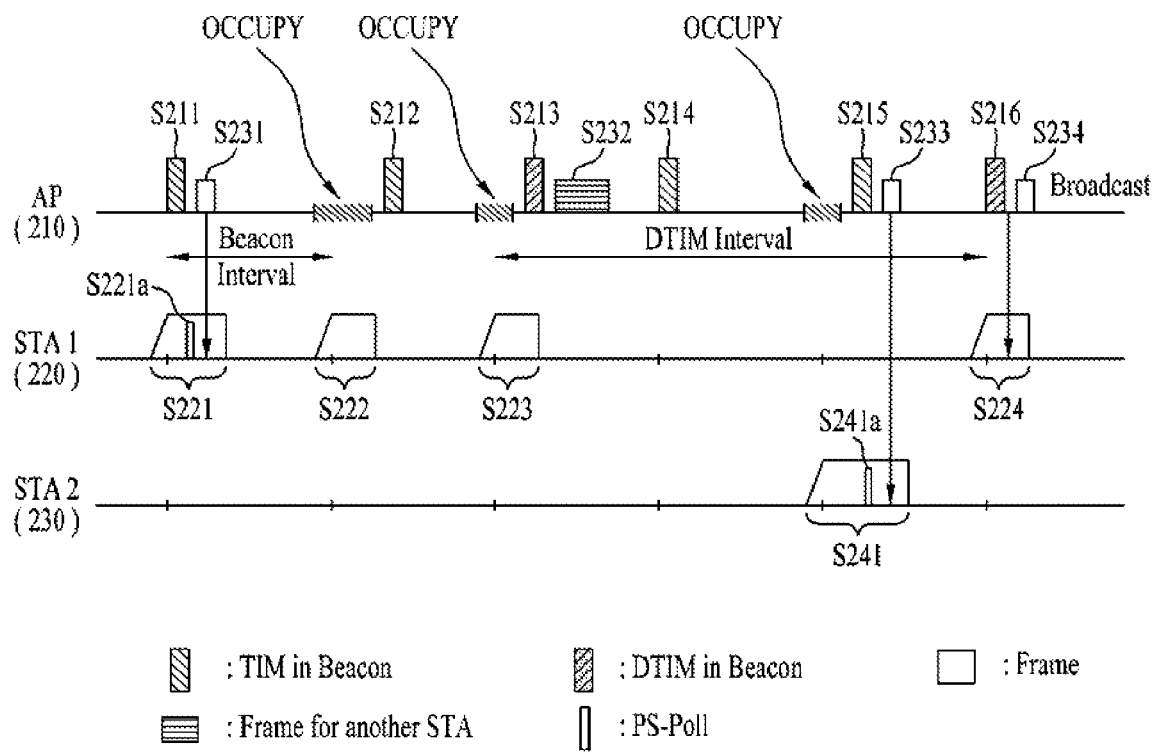
FIG. 6 is a conceptual diagram illustrating a power management operation.

FIG. 6 is a conceptual diagram illustrating a power management (PM) operation.

Referring to FIG. 6, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 6, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 6, the TIM element may include either a TIM indicating the presence or absence of a frame to be transmitted to the STA, or a DTIM indicating the presence or absence of a broadcast/multicast frame. DTIM may be implemented through field setting of the TIM element.

Security Association (SA) Query Process

As can be seen from FIG. 5, the STA may transmit an association request frame to the AP, and the AP may transmit an association response frame to the STA in response to the association request frame. The association request frame and the association response frame may belong to a management frame. The association request frame may include capability of the STA, SSID, etc. The association response frame may include capability of the AP, etc. Specifically, the association response frame may further include an association ID (AID) allocated to the STA requesting association.

Table 1 shows an exemplary format of an association request frame body.

TABLE 1

| Order | Information (length in octet) | Notes |
|---|---|---|
| 1 | Capability (2) | |
| 2 | Listen interval (2) | |
| 3 | SSID (2) | |
| 4 | Supported rates (3-10) | |
| 5 | Extended Supported Rates (3-257) | The Extended Supported Rates element is present if there are more than eight supported rates, and it is optional otherwise. |
| 6 | Power Capability (4-257) | The Power Capability element is present if dot11SpectrumManagementRequired is true or dot11RadioMeasurementActivated is true. |
| 7 | Supported Channels (4-256) | The Supported Channels element is present if dot11SpectrumManagementRequired is true and dot11ExtendedChannelSwitchActivated is false. |
| 8 | RSN (36-256) | The RSN element is present if dot11RSNAActivated set to true. |
| 9 | QoS Capability (3) | The QoS Capability element is present if dot11QosOption-Implemented is true. |
| 10 | RM Enabled Capabilities (7) | RM Enabled Capabilities element is present if dot11RadioMeasurementActivated is true. |
| 11 | Mobility domain (5) | The MDE is present in an Association Request frame if dot11FastBSSTransitionActivated is true and if the frame is being sent to an AP that advertised its FT capability in the MDE in its Beacon or Probe Response frame (i.e., AP also has dot11FastBSSTransitionActivated set to true). |
| 12 | Supported Operating Classes (4-255) | The Supported Operating Classes element is present if dot11ExtendedChannelSwitchActivated is true. |
| 13 | HT Capabilities (28) | The HT Capabilities element is present when dot11HighThroughputOptionImplemented attribute is true. |
| 14 | 20/40 BSS Coexistence (3) | The 20/40 BSS Coexistence element is optionally present when the dot112040BSSCoexistenceManagementSupport attribute is true. |
| 15 | Extended Capabilities (3) | The Extended Capabilities element is optionally present if any of the fields in this element are nonzero. |
| Last | Vendor Specific (3-257) | One or more vendor-specific elements are optionally present. These elements follow all other elements. |

Table 2 shows an exemplary format of the association response frame body.

TABLE 2

| Order | Information | Notes |
|---|---|---|
| 1 | Capability | |
| 2 | Status code | |
| 3 | AID | |
| 4 | Supported rates | |
| 5 | Extended Supported Rates | The Extended Supported Rates element is present if there are more than eight supported rates, and it is optional otherwise. |

TABLE 2-continued

| Order | Information | Notes |
|---|---|---|
| 6 | EDCA Parameter Set | |
| 7 | RCPI | The RCPI element is present if dot11RMRCPIMeasurementActivated is true. |
| 8 | RSNI | The RSNI element is present if dot11RMRSNIMeasurementActivated is true. |
| 9 | RM Enabled Capabilities | RM Enabled Capabilities element is present if dot11RadioMeasurementActivated is true. |
| 10 | Mobility domain | An MDE is present in an Association Response frame when dot11FastBSSTransitionActivated is true and this frame is a response to an Association Request frame that contained an MDE (i.e., an FT initial mobility domain association exchange). |
| 11 | Fast BSS transition | A Fast BSS Transition element (FTE) is present in an Association Response frame when dot11FastBSSTransitionActivated is true, dot11RSNAActivated is true and this frame is a response to an Association Request frame that contained an MDE (i.e., an FT initial mobility domain association exchange in an RSN). |
| 12 | DSE registered location | The DSE Registered Location element is present if dot11LCIDSERequired is true |
| 13 | Timeout Interval (Association Comeback time) | A Timeout Interval element containing the Association Comeback time is present when dot11RSNAActivated is true, dot11RSNAProtectedManagementFramesActivated is true and the association request is rejected with a status code 30. |
| 14 | HT Capabilities | The HT Capabilities element is present when dot11HighThroughputOptionImplemented attribute is true. |
| 15 | HT Operation | The HT Operation element is included by an AP when dot11HighThroughputOptionImplemented attribute is true. |
| 16 | 20/40 BSS Coexistence | The 20/40 BSS Coexistence element is optionally present when the dot112040BSSCoexistenceManagementSupport attribute is true. |
| 17 | Overlapping BSS Scan Parameters | The Overlapping BSS Scan Parameters element is optionally present if the dot11FortyMHzOptionImplemented attribute is true. |
| 18 | Extended Capabilities | The Extended Capabilities element is optionally present if any of the fields in this element are nonzero. |
| Last | Vendor Specific | One or more vendor-specific elements are optionally present. These elements follow all other elements. |

The association maintenance method proposed by the present invention includes a method for preventing association between the STA and the AP from being destroyed. In addition, when the STA fails to associate with the legacy AP and attempts to re-associate with the corresponding AP, a method for reducing a time consumed for such association process is also included in the above association maintenance method. In this case, we assumed that the situation of association failure between the STA and the AP includes, for example, one case in which the STA is instantaneously powered off, and the other case in which the STA moves and escapes from a service range of the legacy connected AP.

The STA recovered from such failure may re-perform the scanning process, and may transmit the association request frame to the AP selected through scanning. In this case, assuming that the AP selected through scanning is already associated with the STA, there is a need for the AP to confirm whether or not the corresponding STA is a correctly authenticated user. Therefore, assuming that the STA having transmitted the association request frame to the AP maintains the security association (SA) state related to the corresponding AP, the AP may perform the SA query procedure prior before generating a response signal indicating a successful association request in response to the newly received association request frame.

Upon receiving the association request frame from the STA that is in the SA state in relation to the AP, the SA query procedure may be a specific process in which the corresponding STA is in the SA state in relation to the AP.

In more detail, upon receiving the association request frame from the STA, the AP transmits an association response frame in response to the association request frame. A state code of the association response frame may be set to 30. The status code field '30' may indicate that association request is temporarily rejected and is then attempted later. Association Comeback Time is allocated to the STA by a Timeout Interval field of the association response frame. If the association comeback time value is assigned to the STA, the STA may retransmit the association request frame to the AP after lapse of the association comeback time. The association comeback time is a default value such as, for example, 1 second.

After the AP rejects the association request frame of the STA, the AP may exchange the SA query request/response frames with the STA configured to maintain the security association (SA) status during the association comeback time. The exchange of the SA query request/response frames may be carried out to determine whether the SA status stored in the AP is normal or invalid.

The AP may transmit the SA query request frame to the STA. Upon receiving the SA query request frame, the STA may transmit the SA query response frame indicating that the SA status is normal to the AP. The SA query request frame and the SA query response frame may correspond to protected management frames.

Figure 7:
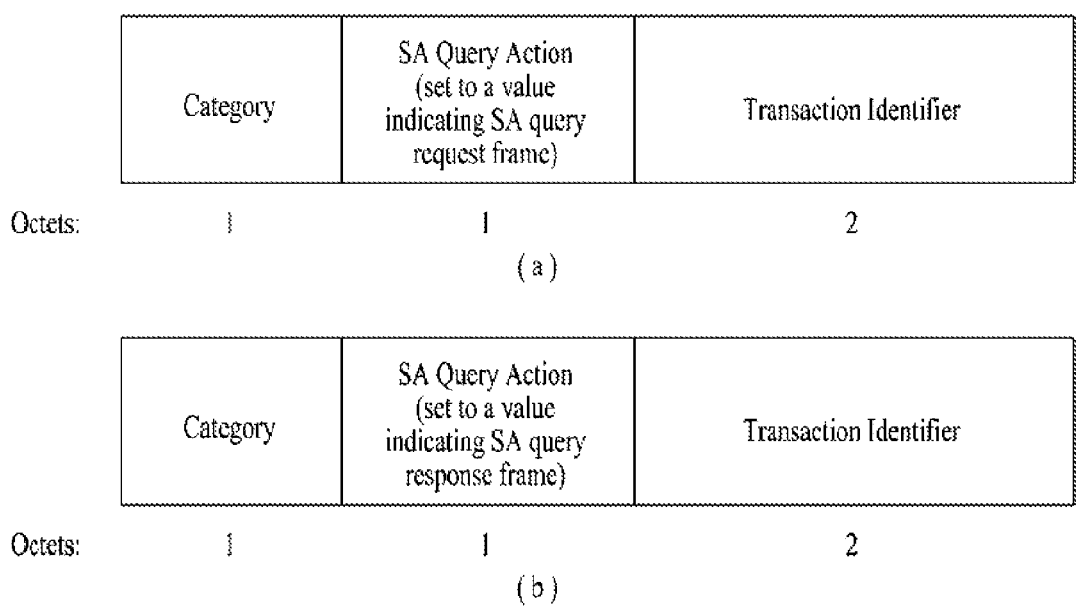
FIG. 7 is a conceptual diagram illustrating an exemplary format of a security association (SA) query request frame and a security association (SA) query response frame.

FIG. 7 is a conceptual diagram illustrating an exemplary format of a security association (SA) query request frame and a security association (SA) query response frame.

FIG. 7(a) shows an exemplary format of the SA query request frame.

Referring to FIG. 7(a), the category field may be set to a specific value (e.g., 8) indicating the SA query category.

The SA Query Action field may be set to a specific value (e.g., 0) indicating the SA query request frame.

The transaction Identifier field may be used as a specific value for identifying the SA query request/response transaction. The value of the transaction identifier may be established by a transmission side (e.g., AP) configured to transmit the SA query request frame, and may be set to a non-negative counter value of 16 bits.

FIG. 7(b) shows an exemplary format of the SA query response frame.

Referring to FIG. 7(b), the category field may be set to a specific value (e.g., 8) indicating the SA query category.

The SA Query Action field may be set to a specific value (e.g., 1) indicating the SA query response frame.

The Transaction Identifier field may have the same value as that of the transaction identifier field included in the SA query request frame.

If the AP does not receive a valid SA query response frame from the STA during a predetermined time (e.g., a time interval established in response to a value of the 'dot11AssociationSAQueryMaximumTimeout' parameter) after transmission of the SA query request frame, the AP does not perform the SA query process for the association request frame to be received later.

SME and MLME operations of AP and STA associated with the SA process will hereinafter be described in detail.

If the AP has a security association (SA) valid for the STA, the AP can be operated as follows. The SME of the AP generates a MLME-ASSOCIATE.response primitive indicating "Association request rejected temporarily; try again later" and thus rejects the association request. The SME of the AP may include a Timeout Interval element in the MLME-ASSOCIATE.response primitive. In this case, the Timeout Interval element may have three timeout interval types (i.e., association comeback time), and the Timeout Interval value may specify a comeback time in which the AP can accept association with the corresponding STA. Subsequently, the SME of the AP may transmit the MLME-SAQuery.request primitive directing the STA at intervals of a predetermined time corresponding to the 'dot11AssociationSAQueryRetryTimeout' number of time units (TUs). In this case, transmission of the MLME-SAQuery.request primitive may be carried out before 'MLME-SAQuery.confirm' primitive corresponding to the MLME-SAQuery.request primitive is received, or may be carried out until a predetermined time corresponding to the 'dot11AssociationSAQueryMaximumTimeout' number of TUs elapses after the SA query process begins.

Figure 8:
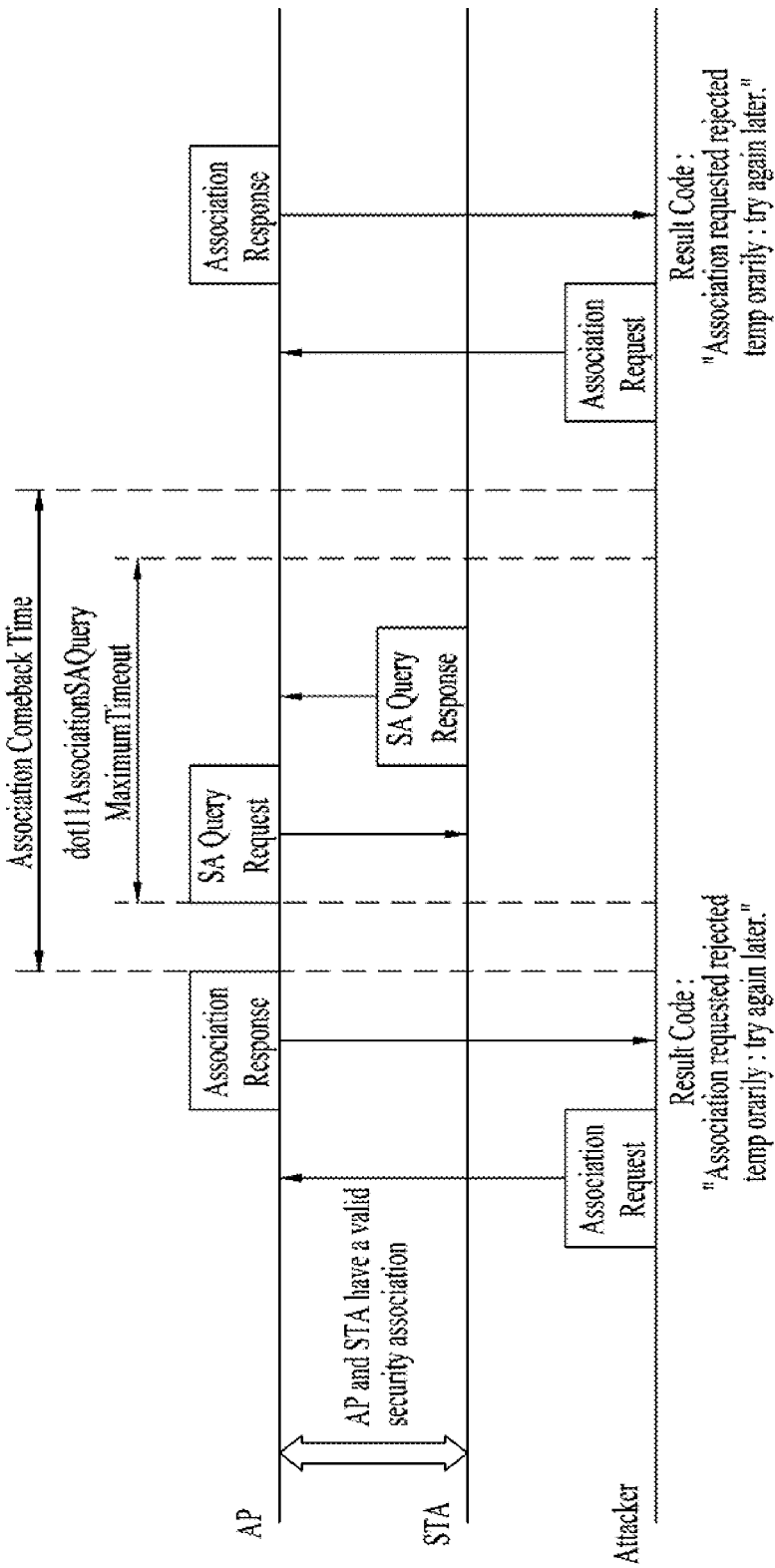
FIG. 8 is a conceptual diagram illustrating an example of the SA query process.

FIG. 8 is a conceptual diagram illustrating an example of the SA query process.

Under the condition that a valid SA status between the AP and the STA is maintained as shown in FIG. 8, the AP may receive a new association request frame from another STA (hereinafter referred to as an attacker) having the same MAC address as that of the corresponding STA. In this case, the AP recognizes an association request frame transmitted from the attacker as an association request frame transmitted from the STA having a valid SA status, transmits an association request frame rejecting the corresponding association request frame to the attacker, and informs the attacker of the association comeback time through the association response frame. The attacker may reattempt to achieve association after lapse of the association comeback time.

On the other hand, after the AP rejects the association request from the attacker, the AP may transmit the SA query request frame to the corresponding STA so as to determine whether the corresponding STA maintains the valid SA status. The STA maintains the SA status, such that it can answer the SA query request frame received from the AP. If the AP successfully receives the SA query response frame, the AP considers that the corresponding STA maintains the valid SA status, and then rejects the association request frame received from the attacker.

In addition, the association request frame transmitted from the attacker is rejected before the association comeback time expires.

In FIG. 8, the 'dot11AssociationSAQuery MaximumTimeout' value is set to the number of time units (TUs) based on a first SA query request by which the association process starts operation. In more detail, after scheduling of the first SA query request starting the association process, if the SA query process is not received, the AP is in a standby mode without starting an additional SA query process during each TU.

In general, the dot11AssociationSAQuery MaximumTimeout value and the association comeback time have the same values. If necessary, the association comeback time may be higher than the dot11AssociationSAQuery MaximumTimeout value in consideration of a time delay processed by the MAC. The time delay unavoidably occurs in the MAC when the association request frame is rejected and the SA query process then starts operation.

Figure 9:
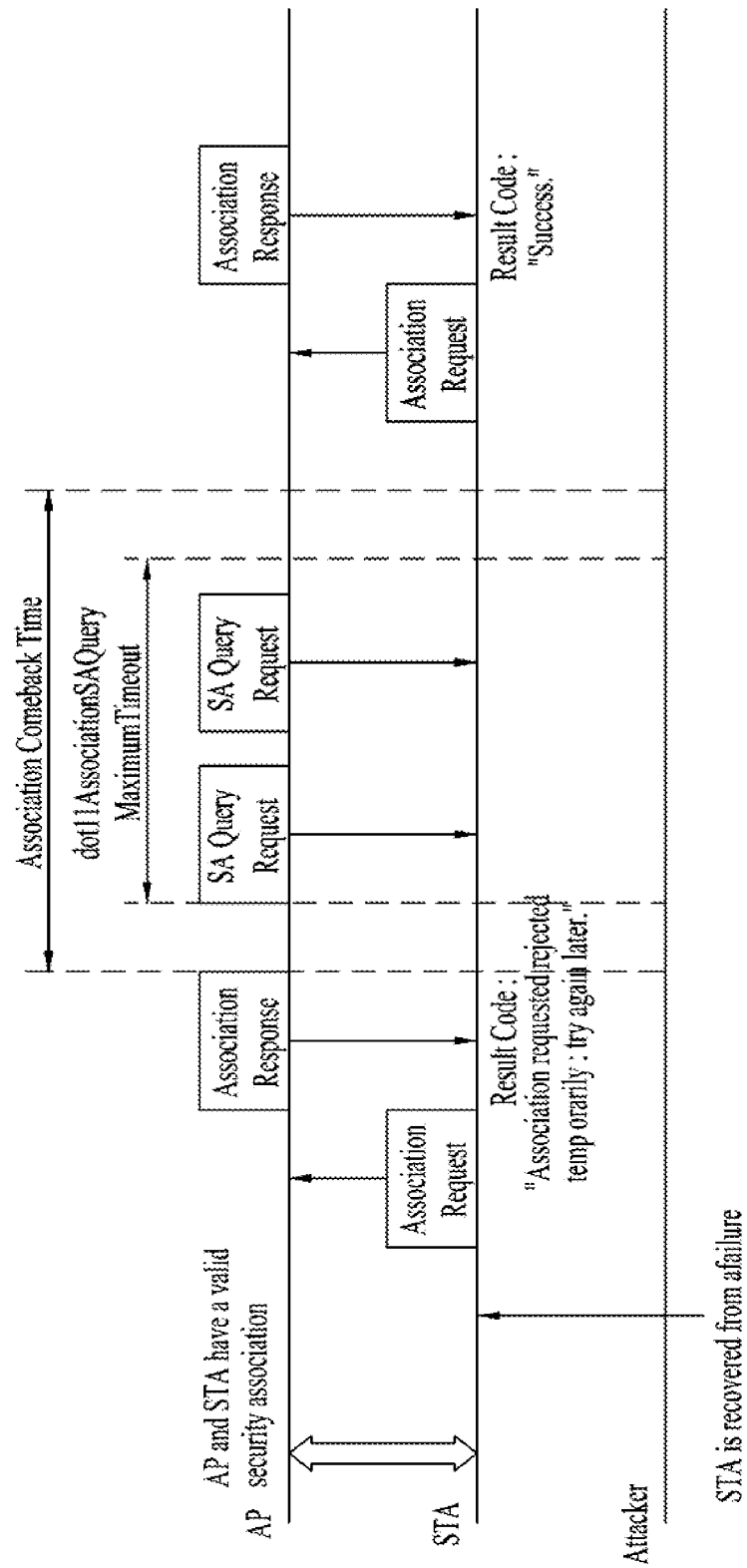
FIG. 9 is a conceptual diagram illustrating another example of the SA query process.

FIG. 9 is a conceptual diagram illustrating another example of the SA query process.

FIG. 9 shows that the STA maintaining a valid SA status in relation to the AP recovers from association failure. If failure occurs in the STA, SA status information related to the AP disappears from the STA. Accordingly, the recovered STA repeatedly performs the AP association process, and may retransmit the association request frame to the AP.

On the other hand, the AP may maintain the SA status in relation to the corresponding STA. Therefore, assuming that the AP recognizes reception of the association request from the STA having a valid SA status, the AP may transmit an association response frame of a status code rejecting the association request generated from the STA. In this case, the AP may establish an association comeback time as a predetermined value (e.g., 1 second or 1 minute) through the association request frame, and may transmit the association comeback time of the predetermined value to the STA.

Meanwhile, after the AP rejects the association request from the STA, the AP may transmit the SA query request frame to the corresponding STA. Although the STA recovers from a failure status, all of previous SA status information has already been lost, so that the STA cannot answer the SA query frame received from the AP. If the AP does not receive a valid SA query response frame from the STA during the dot11AssociationSAQueryMaximumTimeout time, the AP considers that the corresponding STA has an invalid SA status. Accordingly, the association request frame transmitted from the STA after lapse of the association comeback time is accepted by the AP.

As described above, the association request frame received from the STA having an SA status is first rejected, and the AP performs the SA query operation for the STA during the association comeback time. If the STA does not answer the SA query request, the AP may accept the next association request generated after lapse of the association comeback time. That is, if the STA answers the SA query, it is determined that a first association request frame belongs to the attacker, such that the association request generated after lapse of the association comeback time is rejected. If the STA does not answer the SA query, it is determined that the actual STA but not the attacker has transmitted the association request, such that the association request generated after lapse of the association comeback time is accepted.

Figure 10:
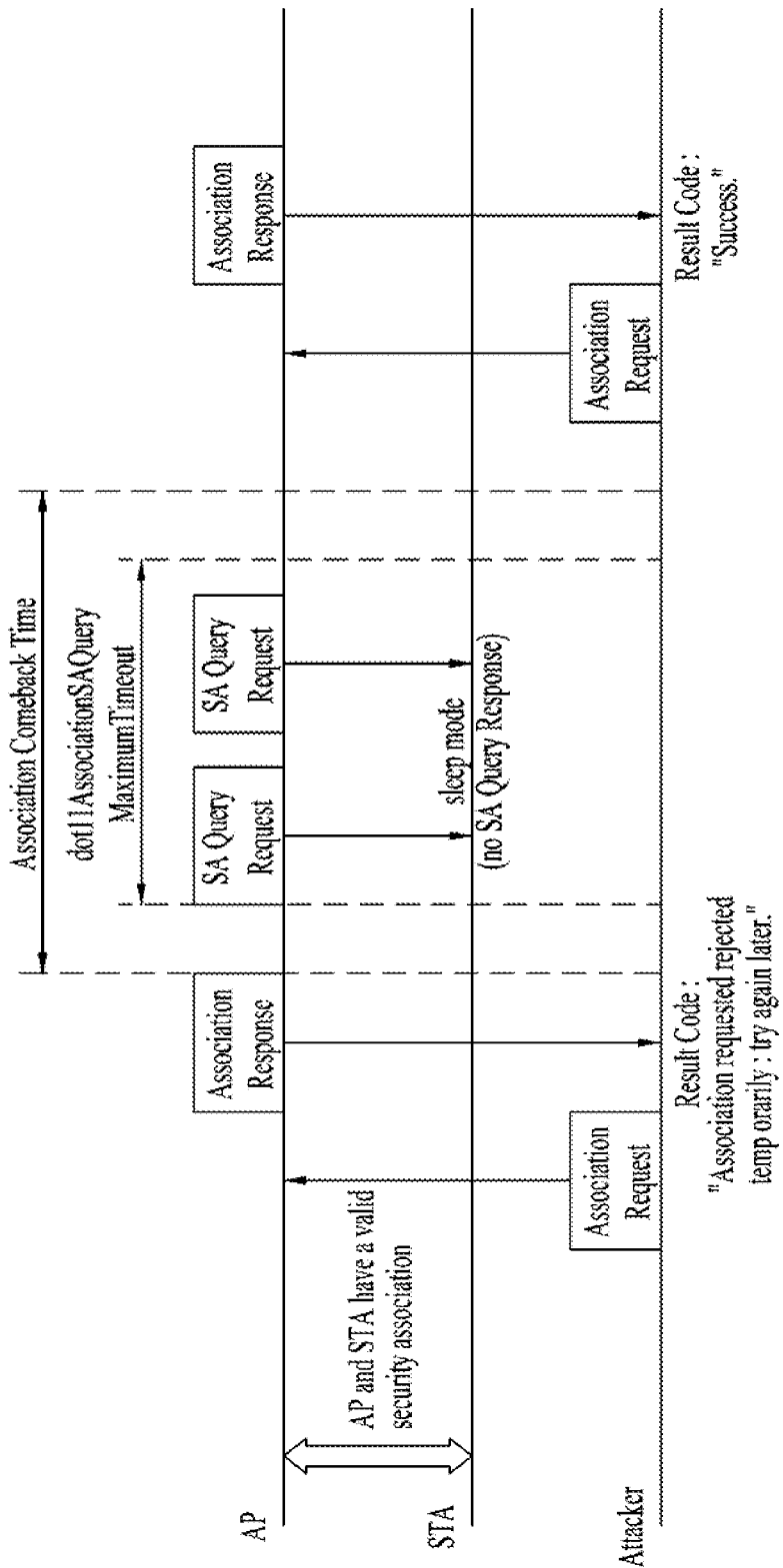
FIG. 10 is a conceptual diagram illustrating another example of the SA query process.

FIG. 10 is a conceptual diagram illustrating another example of the SA query process.

In the same manner as in FIG. 8, the example of FIG. 10 assumes that the STA maintains an SA status valid for the AP, and the attacker transmits the association request to the AP using the MAC address of the STA. The AP transmits the association request frame rejecting the association request of the attacker, and at the same time informs the STA of the association comeback time.

The AP may attempt to exchange the SA query request/response with the STA during either the association comeback time or the dot11AssociationSAQuery MaximumTimeout time.

For example, in order to support applications (such as a sensor, a smart grid, M2M communication, etc.) under a band of 1 GHz or less by the STA (e.g., a long-sleeper type STA or S1G (Sub 1 GHz) STA) capable of maintaining a low-power status for a long period of time, the STA may continuously stay in the doze status during the dot11AssociationSAQueryMaximumTimeout time. In this case, the STA may not answer the SA query request frame received from the AP. Accordingly, the AP may accept an association request of the attacker after lapse of the association comeback time, such that it is impossible to correctly protect a legitimate STA.

As described above, in accordance with the legacy SA query operation, it is impossible to make a distinction between one association request of the STA and the other association request of the attacker.

Security Problem Supplementation

In accordance with the above-mentioned SA query process, a frame to be transmitted to the legitimate STA may be transferred to a malicious STA. Specifically, the low-power STA may be vulnerable to an attack of the malicious STA.

In order to improve the above-mentioned problem, assuming that the SA-connected STA does not answer the SA query, and the AP accepts an association request generated from a certain STA after lapse of the association comeback time, if a frame to be transmitted to the SA-connected STA is buffered by the AP, the AP must delete the corresponding frames from the buffer, because it is impossible to determine whether the STA attempting new association is a legitimate STA or a malicious STA.

In addition, assuming that the SA-connected SA does not answer the SA query and the AP accepts an association request received from a certain STA after lapse of the association comeback time, the corresponding STA associated with the AP may transmit the PS-Poll frame to the AP so as to receive the buffered frame from the AP. In this case, the AP having received the PS-Poll frame does not immediately transmit the buffered frame to the corresponding STA, transmits the SA query request frame to the corresponding STA, confirms the SA status information once more, and transmits the confirmed result. The above-mentioned procedure may determine whether or not the STA transmitting the PS-Poll frame has normal SA status information, so as to prepare for the case in which the malicious STA deletes SA status information of the legitimate STA from the AP. Accordingly, assuming that the AP receives an arbitrary protected management frame configured to confirm the SA status information from the corresponding STA, the AP may not always transmit the SA query request frame after lapse of the PS-Poll frame.

FIG. 11 are conceptual diagrams illustrating various embodiments of the secure PS-Poll process.

Referring to FIG. 11(a), the AP having received the PS-Poll frame from the STA transmits the SA query request frame, and thus generates a confirmation request of SA status information of the corresponding STA. The STA having received the SA query request frame confirms whether or not the SA query request frame corresponding to the protected management frame is normally encrypted, and then transmits the SA query response frame to the AP. That is, if SA status information of the AP is identical to those of the corresponding STA, the STA may transmit the SA query response frame and transmit a confirmation message of data frame delivery to the AP. On the other hand, if the SA status information of the AP is different from those of the corresponding STA, the STA fails to perform integrity checking of the SA query request, such that the STA may generate no response. If the SA query response is not generated in response to the SA query request, the AP may not perform data frame delivery to the corresponding STA.

In addition, after the STA transmits the ACK frame in response to the SA query request as shown in FIG. 11(a), the STA performs backoff after lapse of a predetermined time and then transmits the SA query response frame. The AP having received the SA query response frame transmits the ACK frame, performs backoff after lapse of a predetermined time, and then transmits a data frame. As a result, the STA may transmit the ACK frame.

Although the AP having received the PS-Poll frame from the STA may immediately transmit the SA query request frame as shown in FIG. 11(b), the AP may first transmit the ACK frame and then transmit the SA query request frame.

The PS-Poll scheme shown in FIG. 11(a) is referred to as an immediate secure PS-Poll scheme in which the SA query request frame is transmitted in response to the PS-Poll frame without using the ACK frame. The PS-Poll scheme shown in FIG. 11(b) is referred to as a deferred secure PS-Poll scheme in which the ACK frame is transmitted in response to the PS-Poll frame and the SA query request frame is then transmitted.

In addition, the PS-Poll scheme shown in FIG. 11(c) is referred to as a 'without-ACK deferred secure PS-Poll policy' in which the SA query response frame is immediately transmitted as a response to the SA query request frame.

If transmission of multiple frames is allowed after lapse of the PS-Poll frame, the SA query request frame may be transmitted after a Shorter Inter-Frame Space (SIFS), after lapse of the ACK frame of the PS-Poll frame as shown in FIG. 11(d).

Upon receiving the SA query response frame from the STA in response to the SA query request frame, the AP may define a protocol so as to transfer the buffered frame to the STA. Accordingly, the buffered data frame for a legitimate STA is prevented from being applied to the malicious STA.

Association Operation Optimization

The present invention proposes a method for indicating whether or not association of the corresponding STA is accepted before expiration of the association comeback time so as to prevent an unnecessary association attempt of STAs.

After the AP rejects a new association request, it is assumed that the SA query response for the SA query request is successfully received before expiration of the association comeback time. In this case, the AP may indicates that association of the MAC address of the corresponding STA is rejected through a beacon frame, a probe response frame, etc.

For example, the association control information element may be contained in the beacon frame, the probe response frame, etc. The association control information element may include a MAC address of the STA, an association request of which is to be rejected.

In addition, if the AP aims to accept the association request of a certain STA due to a special reason, the association control information element may further include information regarding the MAC address of the STA that desires to accept the association request. In this case, not only a Type Field indicating whether association of the corresponding STA is accepted or rejected, but also MAC address information of the STA may be contained in the association control information element.

Association Maintenance Method

The present invention can prevent a frame to be applied to the legitimate STA from being wrongly applied to the malicious STA according to the above-mentioned method. However, the present invention cannot basically solve the problem in which the malicious STA is associated with the AP and the legitimate STA is not associated with the AP.

In order to obviate the above-mentioned problem, there is a need to modify the legacy association comeback time setting. For example, assuming that the STA is in a low-power status (e.g., sleep mode or doze status) for 10 minutes, it is necessary to allocate a long time of 10 minutes or more to the association comeback time associated with the SA query process or the dot11AssociationSAQueryMaximumTimeout parameter. After the AP rejects the initial association request frame, the AP must attempt to exchange the SA query request/response frame for 10 minutes, such that the STA having a sleep mode of about 10 minutes may have an opportunity to transmit the SA query response. That is, the association comeback time or the dot11AssociationSAQueryMaximumTimeout time may be set to a long time in consideration of the STA sleep-mode maintenance time, such that it is determined whether the STA does not answer the SA query request frame because the STA is in a low-power status, or it is determined whether the STA does not answer the SA query response frame because the SA status of the corresponding STA is no longer valid.

The present invention proposes a method for allowing the AP to provide different association comeback times according to STA types. For example, the STA type (e.g., S1G (Sub 1 GHz) STA) supporting applications such as a sensor, a smart grid, an M2M, etc. has a low duty cycle, such that a relatively high value may be assigned to the association comeback time. In contrast, the other general STA (e.g., traffic oriented STA) has a high duty cycle, such that a relatively low value may be assigned to the association comeback time.

In addition, if a large number of STAs are simultaneously recovered from a failure status, the STAs simultaneously attempt to perform association, resulting in an increased frequency of collisions. In order to solve the above problem, the association comeback time is randomized even when the STA types are identical to each other, and the randomized result may be applied to the STA. If the STAs have different comeback times allocated to the STAs having the same initial association attempt time, the individual STAs have different waiting times until reattempting to perform association, resulting in reduction of the probability of performing simultaneous channel access.

For this purpose, when the STA transmits the association request frame, STA type information may be contained in the association request frame. If the AP receives the STA type information contained in the association request frame, the AP may decide the association comeback time of the corresponding STA on the basis of the received information.

The AP may inform the STA of the association comeback time through the association response frame. In accordance with the present invention, even when the STA attempts to perform initial association with the AP, the AP may include information regarding the association comeback time in the association response frame. In addition, according to the present invention, when the STA requests association, and a status code (0) indicating a success is assigned to the association response frame by the AP, information regarding the association comeback time may be contained in the corresponding association response frame.

That is, according to the proposal of the present invention, when the AP rejects the association request, the AP informs the STA of the association comeback time, such that the corresponding STA does not reattempt to perform association during the association comeback time. In addition, even when the AP accepts the STA association request, the association comeback time may be contained in the association response frame. Accordingly, if the STA desires to continuously maintain the SA status, the AP may provide necessary information (e.g., specific information indicating that an association comeback time or dot11AssociationSAQuery MaximumTimeout is assigned to a wakeup interval of the STA) to the STA at intervals of an association comeback time such that the STA can awake at intervals of the association comeback time. Accordingly, the STA awakes on the basis of the association comeback time or dot11AssociationSAQueryMaximumTimeout interval (e.g., a shorter time than dot11AssociationSAQuery MaximumTimeout), such that the STA can attempt to receive the SA query request frame and can maintain a valid SA status.

In addition, if the AP desires to change the association comeback time applied to the STA, the AP may inform the STA of the changed association comeback time value through a beacon frame, a probe response frame, etc.

In addition, if the AP assigns different association comeback time values to STA types, different dot11AssociatioSAQuery MaximumTimeout values may be assigned to the STA types. Alternatively, although the same STA types are used, different dot11AssociatioSAQuery MaximumTimeout values may be assigned to individual STAs.

The association comeback time transferred from the AP to the STA through the association response frame or the re-association response frame may be assigned the same value as the dot11AssociatioSAQueryMaximumTimeout value, or may be assigned a higher value than the dot11AssociatioSAQuery MaximumTimeout value.

If the STA having successfully completed the association process receives the association comeback time (or dot11AssociatioSAQuery MaximumTimeout) from the AP, the STA awakes at intervals of a shorter time than the association comeback time (or dot11AssociatioSAQuery MaximumTimeout) interval, such that the STA must recognize the presence or absence of the SA query request frame received from the AP.

That is, the STA awakes more frequently than the association comeback time (or dot11AssociatioSAQuery MaximumTimeout) interval and transmits the PS-Poll frame; or the STA confirms whether the buffered frame is present in the AP through the TIM element of the beacon frame and receives the buffered frame.

Figure 12:
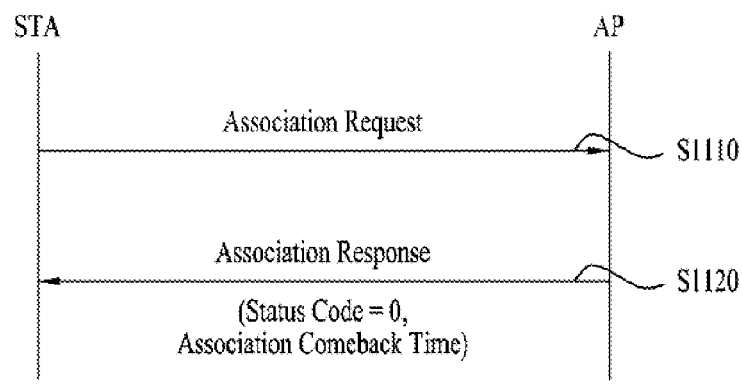
FIG. 12 is a flowchart illustrating a method for maintaining association according to an example of the present invention.

FIG. 12 is a flowchart illustrating an association maintenance method according to the example of the present invention.

In step S1110, the STA may transmit the association request frame to the AP. In this case, the STA has a valid SA status in relation to the AP. In addition, the STA may operate in the PS (Power Save) mode.

In step S1120, even when the AP accepts the association request of the STA, association comeback time information may be contained in the association response frame. For example, the status code of the association response frame is set to zero (0) (i.e., success), and the association response frame may include association comeback time information.

Accordingly, upon receiving the association comeback time from the AP, the STA awakes at intervals of the same or shorter time than the association comeback time received from the AP, and attempts to receive the SA query request frame from the AP. Upon receiving the SA query request, the STA may transmit the SA query response to the AP. Accordingly, a valid SA status between the STA and the AP can be maintained.

The association maintenance method according to the embodiment shown in FIG. 12 may be implemented such that the above described various embodiments of the present invention may be independently applied or two or more embodiments thereof may be simultaneously applied.

Figure 13:
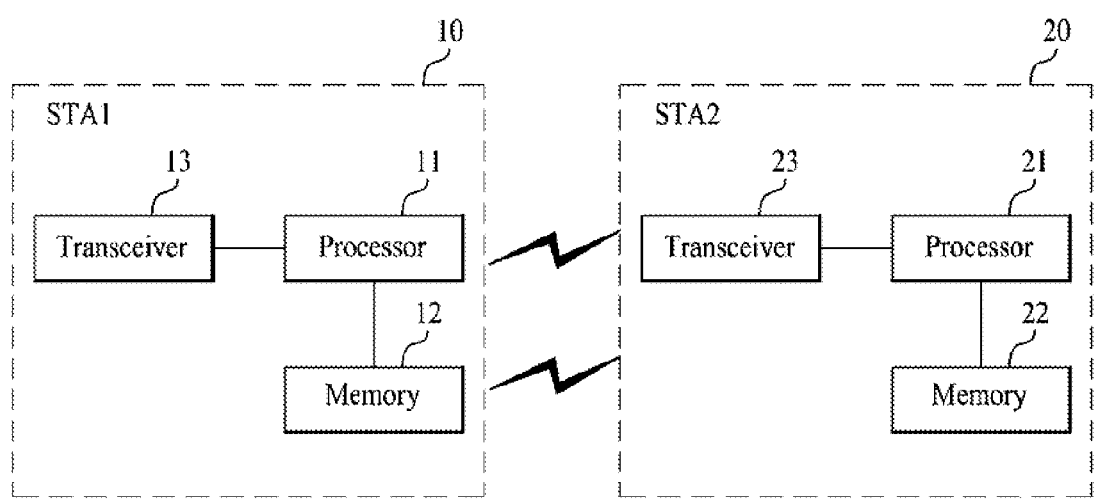
FIG. 13 is a block diagram illustrating a radio frequency (RF) device according to one embodiment of the present invention.

FIG. 13 is a block diagram illustrating a radio frequency (RF) device according to one embodiment of the present invention.

Referring to FIG. 13, an AP 10 may include a processor 11, a memory 12, and a transceiver 13. An STA 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above described various embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The processor 11 of the AP 10 shown in FIG. 13 may receive the association request frame from the STA 20 using the transceiver 13. In addition, the processor 11 may transmit the association response frame to the STA 20 using the transceiver 13. In this case, even when the association request is accepted, information regarding the association comeback time may be contained in the association response frame.

The processor 21 of the STA 20 shown in FIG. 13 may transmit the association request frame to the AP 10 using the transceiver 23. In addition, the processor 21 may receive the association response frame from the AP 10 using the transceiver 23. In this case, even when the AP 10 accepts the association request, the association comeback time information may be contained in the association response frame. Accordingly, the processor 21 of the STA 20 may awake at intervals of the same or shorter time than the association comeback time, and may attempt to receive the SA query request frame from the AP 10. Upon receiving the SA query request, the SA query response may be transferred to the AP 10.

The overall configuration of the AP 10 and the STA 20 shown in FIG. 13 may be implemented such that the above described various embodiments of the present invention may be independently applied or two or more embodiments thereof may be simultaneously applied and a repeated description thereof is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

As is apparent from the above description, exemplary embodiments of the present invention may allow a device operating in a WLAN system to correctly perform/support efficient maintaining association.

Although the above various embodiments of the present invention have been described based on an IEEE 802.11 system, the embodiments may be applied in the same manner to various mobile communication systems. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing a Security Association (SA) query procedure by a station (STA) in a wireless LAN (WLAN) system, the method comprising:
    transmitting an association request frame from the STA to an access point (AP);
    receiving an association response frame from the access point (AP) in response to the association request frame,
    wherein, if the association request is accepted by the AP, the association response frame includes information regarding an association comeback time, and
    performing the SA query procedure on the basis of the received association comeback time.

2. The method of claim 1, wherein the association comeback time is for a reception time of a SA query request frame of the SA query procedure.

3. The method of claim 2, wherein:
    upon receiving the SA query request frame from the AP, the STA transmits a SA query response frame of the SA query procedure to the AP.

4. The method of claim 3, wherein:
    through reception of the SA query request frame or transmission of the SA query response frame, a valid SA status of the STA is maintained.

5. A method for performing a Security Association (SA) query procedure by an access point (AP) in a wireless LAN (WLAN) system, the method comprising:
    receiving an association request frame from a station (STA);
    transmitting an association response frame to the STA in response to the association request frame,
    wherein, if the AP accepts the association request, the AP includes an association comeback time in the association response frame, and
    performing the SA query procedure on the basis of the transmitted association comeback time.

6. The method of claim 5, wherein the association comeback time is for a transmission time of a SA query request frame of the SA query procedure.

7. The method of claim 6, further comprising:
receiving a SA query response frame of the SA query procedure from the STA after transmission of the SA query request frame.

8. The method of claim 7, wherein:
through transmission of the SA query request frame or reception of the SA query response frame, a valid SA status of the STA is maintained.

9. A station (STA) device for performing a Security Association (SA) query procedure in a wireless LAN (WLAN) system, the device comprising:
a transceiver; and
a processor configured to transmit an association request frame to an access point (AP) using the transceiver, and to receive an association response frame from the AP in response to the association request frame,
wherein, if the association request is accepted by the AP, the association response frame includes information regarding an association comeback time, and
wherein the processor is further configured to perform the SA query procedure on the basis of the received association comeback time.

10. The device of claim 9, wherein the association comeback time is for a reception time of a SA query request frame of the SA query procedure.

11. The device of claim 10, wherein the processor is further configured to transmit a SA query response frame of the SA query procedure to the AP upon receiving the SA query request frame from the AP.

12. The device of claim 11, wherein:
through reception of the SA query request frame or transmission of the SA query response frame, a valid SA status of the STA is maintained.

13. An access point (AP) device for performing a Security Association (SA) query procedure in a wireless LAN (WLAN) system, the device comprising:
a transceiver; and
a processor configured to receive an association request frame from a station (STA) using the transceiver, and to transmit an association response frame to the STA in response to the association request frame using the transceiver,
wherein, if the processor accepts the association request, the processor includes an association comeback time in the association response frame, and
wherein the processor is further configured to perform the SA query procedure on the basis of the transmitted association comeback time.

14. The device of claim 13, wherein the association comeback time is for a transmission time of a SA query request frame of the SA query procedure.

15. The device of claim 14, wherein the processor is further configured to receive a SA query response frame of the SA query procedure from the STA after transmission of the SA query request frame.

16. The device of claim 15, wherein:
through transmission of the SA query request frame or reception of the SA query response frame, a valid SA status of the STA is maintained.

* * * * *